United States Patent
Daniel

(10) Patent No.: US 7,976,154 B2
(45) Date of Patent: Jul. 12, 2011

(54) METHOD FOR PROTECTING SPECTACLES ARMS, MEMBER BOARD AND METHOD FOR MAKING THE MEMBERS

(76) Inventor: Pierre Daniel, Evreux (FR)

( * ) Notice: Subject to any disclaimer, the term of this patent is extended or adjusted under 35 U.S.C. 154(b) by 0 days.

(21) Appl. No.: 12/513,470

(22) PCT Filed: Oct. 25, 2007

(86) PCT No.: PCT/FR2007/001762
§ 371 (c)(1),
(2), (4) Date: Feb. 8, 2010

(87) PCT Pub. No.: WO2008/053096
PCT Pub. Date: May 8, 2008

(65) Prior Publication Data
US 2010/0139824 A1    Jun. 10, 2010

(30) Foreign Application Priority Data
Nov. 3, 2006    (FR) ..................... 06 09625

(51) Int. Cl.
G02C 5/14    (2006.01)
(52) U.S. Cl. ..................................... 351/122
(58) Field of Classification Search .................. 351/122, 351/117, 178, 111, 41, 158; D16/336
See application file for complete search history.

(56) References Cited

U.S. PATENT DOCUMENTS

| | | | |
|---|---|---|---|
| 4,786,158 A * | 11/1988 | Barfus-Shanks et al. | 351/122 |
| 5,440,355 A * | 8/1995 | Ross | 351/122 |
| 5,583,585 A | 12/1996 | Sternberg et al. | |
| D593,146 S * | 5/2009 | Powless | D16/336 |
| 7,708,400 B2 * | 5/2010 | Coleman et al. | 351/122 |
| D618,272 S * | 6/2010 | Daniel | D16/336 |
| 2001/0043308 A1 | 11/2001 | Menuck et al. | |

FOREIGN PATENT DOCUMENTS

| | | |
|---|---|---|
| DE | 20 2004 018 416 | 1/2005 |
| EP | 0 305 281 A2 | 3/1989 |
| GB | 2 200 473 A | 8/1988 |
| GB | 2 398 884 A | 9/2004 |

* cited by examiner

Primary Examiner — Hung X Dang
(74) Attorney, Agent, or Firm — IM IP Law PLLC; C. Andrew Im

(57) ABSTRACT

The invention pertains to the protection of spectacles arms and relates to a protection member for a spectacles arm comprising an elongated tubular envelope (54) sealed against chemical agents, having an open end and having an essentially flat shape in the plane of a hook-shaped spectacles arms. The envelope (54) includes, at a location corresponding to the position of the bend of a hook-shaped spectacles arm, a device (62) preferably for folding about a transverses axis and for reducing at said location the distance between the inner edge of the bend of the spectacles arm and the edge of the member provided on the side of the bend interior. Application in hairdressing facilities.

10 Claims, 2 Drawing Sheets

US 7,976,154 B2

METHOD FOR PROTECTING SPECTACLES ARMS, MEMBER BOARD AND METHOD FOR MAKING THE MEMBERS

RELATED APPLICATIONS

This application is a §371 application from PCT/FR2007/001762 filed Oct. 25, 2007 which claims priority from French Patent Application No. 06 09625 filed Nov. 3, 2006, each of which is herein incorporated by reference in its entirety.

TECHNICAL FIELD OF THE INVENTION

The present invention relates to a member for temporary protection of a spectacle arm, and a board comprising a plurality of protection members, and a method for producing an example of a protection member.

BACKGROUND OF THE INVENTION

For treating hair in hairdressing salons, various chemical agents are used, in particular dyes. When a client keeps their spectacles on during such treatments, arms of spectacles are at risk of coming into contact with these chemical agents and being subject to colouration, discolouration or even corrosion. So that clients can continue to wear their spectacles, for example, in order to read, during treatments which are often long, in order to temporarily protect the spectacle arms, there are used members which are substantially tubular and which are placed on each spectacle arm.

There are already known, as protection members, simple tubes, as illustrated in FIG. 1, comprising a tubular casing 12 which is cut at the ends thereof, in the region of cutting lines 14, 16, from a series of such tubes, welded at 18 close to an end 14. These series of tubes are formed from a tube of extruded plastics material. Taking into account this technique, it is not possible to produce very thin tubes from an extremely flexible material. Consequently, when such a tube is placed on a crook-like spectacle arm, the portion arranged inside the bend of the crook is wide and must be deformed when the spectacles are positioned. This deformation constitutes folds which bring about irritation with respect to the skin of the head and the ear. The discomfort thus created is substantially due to the fact that it is not possible to obtain tubes of extremely flexible material which have adequate properties of manipulation on the one hand and protection against chemical agents on the other hand. Furthermore, these members have the disadvantage of being able to slide along the spectacle arm and therefore providing poor longitudinal positioning of the tube along the spectacle arm.

According to document EP-305 281, crook-like spectacle arm protection members are also known, as indicated in FIG. 2 which is taken from this document. In this Figure, spectacle arm protection members 10 are fixed on a support sheet which is illustrated in the form of two pages 30, 32 articulated about a fold. The protection members 10 described in the above-mentioned document have a casing which is formed by two sheets of plastics material which are welded to each other along the longitudinal sides and which have an open end whose edges are offset in the longitudinal direction of the casing for ease of opening. These protection members are processed on. a support sheet 30, 32. They can therefore be produced with sheets of plastics material which are extremely thin and flexible so that the members have a very high degree of flexibility and do not cause any irritation. The discomfort of the simple tubes is therefore eliminated, on the one hand, owing to the flexibility of the material and, on the other hand, owing to the crook shape which reduces the width of the member at the location of contact with the ear. Furthermore, owing to the positioning of the bend of the crook on the bend of the spectacle arm, the member cannot slide along the spectacle arm and it therefore provides good longitudinal positioning of the tube along the spectacle arm.

Document US 2001/043308 describes two embodiments of a spectacle arm protector formed by a tube having a constant width over the largest portion of its length, from the inlet opening of a spectacle arm, then having a width which increases progressively towards the closed end. In one embodiment, the tube is rectilinear and similar to that described with reference to FIG. 1 and has the same disadvantages, and, in another embodiment, the tube is bent and similar to that described with reference to FIG. 2.

Protection members 20 are also known as illustrated in FIG. 3, produced in the form of a web by folding a sheet over on itself at one end 24, the opposite end of the member 20 designated 22 being open for the introduction of a spectacle arm. The adjacent members 20 are separated by a welding line 26, 28 which is perforated so that the members 20 can be separated one by one from a roll formed by the wound web. These members have not been very successful since the separation of a member over the entire length thereof is not convenient. Furthermore, the edges obtained have a toothed shape which creates discomfort since this edge is directly in contact with the skin of the person wearing the spectacles.

The superior nature of the protection members described with reference to FIG. 2 has been recognised for some time, but, these members are relatively expensive. As indicated in FIG. 2, owing to the crook shape, the adjacent members 10 of the support sheet 30, 32 must be spaced-apart so that, with a board which is constituted by the support sheet 30, 32 and the two superimposed sheets of flexible plastics material, it is possible to produce only a small number of protection members.

OBJECT AND SUMMARY OF THE INVENTION

An object of the invention is to produce spectacle arm protection members which have the advantages, in particular of comfort, of the members described with reference to FIG. 2 whose quality is undisputed, whilst considerably reducing the cost for producing the protection members.

It would also be possible to envisage producing, on support boards such as 30, 32 illustrated in FIG. 2, protection members which have, instead of the crook shape illustrated in FIG. 2, a rectilinear shape as described in the above-mentioned document US 2001/043308, to bring the members closer and therefore produce a greater number of them from the same support sheet. However, the members have the disadvantages of tubular members, in particular the disadvantage of poor longitudinal positioning and the possibility of sliding the tube along the spectacle arm.

With regard to the protection members described in the above-mentioned document EP-305 281, the invention relates to an improvement which comprises the combination of the technology described in this document, but applied to the production of rectilinear members, allowing the number of members on the same support sheet to be multiplied, and allowing a device to be incorporated which ensures the positioning of the member along the length of the spectacle arm.

More precisely, the protection members according to the invention comprise a preferential folding device which is arranged so as to be located in the region of the bend of a crook-like spectacle arm, this device on the one hand ensuring the longitudinal positioning of the member on the spectacle arm and on the other hand reducing the quantity of material of the member between the spectacle arm and the contact location of the member with the skin of the head and the ear of the client of the hairdresser. In a preferred embodiment, these protection members benefit from the comfort properties which are obtained owing to the very flexible plastics material of the members produced from a support sheet, in accordance with the technology of the above-mentioned document EP-305 281.

In this manner, the invention combines the advantages of the longitudinal positioning of the protection member on the spectacle arm at a reduced cost obtained owing to members having a rectilinear shape, and preferably with the comfort and the ease of handling of the protection members produced on a support sheet, as described in document EP-305 281.

More precisely, the invention relates to a member for temporarily protecting a spectacle arm against chemical agents, the member comprising an elongate tubular casing which has at least one open end via which it can be arranged on a spectacle arm, the casing being formed by plastics material which is impermeable with respect to chemical treatment agents and which has, over the entire length thereof, a cross-section such that the spectacle arm is not compressed and significant space remains around the spectacle arm, facilitating the introduction of a spectacle arm into the casing, the casing being sufficiently long to normally cover at least the largest portion of a spectacle arm, the casing having a substantially planar shape in the plane of a crook-like spectacle arm when it is arranged on such an arm; according to the invention, the casing comprises, at a location corresponding to the position of the bend of a crook-like spectacle arm, a device for preferential folding about a transverse axis, which is intended to reduce at this location the distance between the inner edge of the bend of the spectacle arm and the edge of the member arranged at the side of the interior of the bend.

In an embodiment, the preferential folding device is a reduction of the cross-section of the tubular casing.

In a variant, the reduction of the cross-section of the tubular casing is a reduction of the width of the member of planar form, the reduction of width being, for example, progressive.

In another variant, the reduction in the cross-section of the tubular casing is a localised progressive reduction of the cross-section of the tube in open form.

In another embodiment, the preferential folding device comprises a gathering of the wall of the casing.

Preferably, the casing has a single open end.

Preferably, the edges of the opening of the open end are offset relative to each other in the longitudinal direction of the casing.

In a very advantageous embodiment, the casing is formed by two sheets of plastics material which are welded to each other along longitudinal sides and, at the location of the preferential folding device, the distance between the two longitudinal sides is reduced.

The invention also relates to a board of spectacle arm protection members which comprises a support sheet and a plurality of protection members according to any one of the preceding claims which are fixed to the support sheet. For example, the support sheet is formed from paper.

Preferably, the protection members are directly fixed to the support sheet by their plastics material.

The invention also relates to a method for producing temporary spectacle arm protection members, of the type involving extruding a continuous tube of plastics material having thermoretractable properties, then cutting the tube at regular intervals in order to form tube portions which are intended to constitute temporary spectacle arm protection members; according to the invention, the method involves, before cutting the tube, a step for localised heating of the tube so that the cross-section thereof is reduced.

Preferably, the method comprises, with the cutting of the tube, a step of transverse welding of the tube close to the cutting.

BRIEF DESCRIPTION OF THE DRAWINGS

Other features and advantages of the invention will be better understood from a reading of the following description, given with reference to the appended drawings in which.

DETAILED DESCRIPTION OF THE EMBODIMENTS

Figure 4:
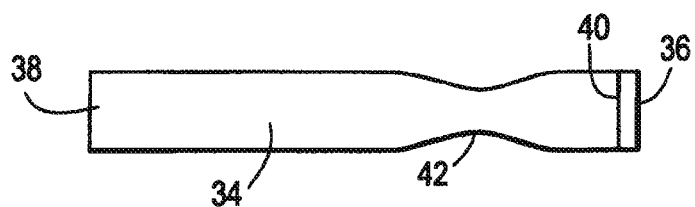
FIG. 4 is a front view of a protection member according to the invention, comprising a preferential folding device according to the invention.

FIG. 4 illustrates a member for temporarily protecting a spectacle arm in an embodiment of the invention which corresponds to an improvement of the protection member of the prior art described with reference to FIG. 1, by incorporation of a preferential folding device according to the invention.

More precisely, the protection member comprises a casing which is formed by a tubular portion 34 which, at the two ends 36, 38 thereof, is separated from other portions by perforation lines which are intended to be torn as the protection members are used. Preferably, a weld seam 40 is formed close to one end 36. In this manner, the member illustrated in FIG. 4 is intended to be opened via the opening 38 in order to introduce the end of a spectacle arm as far as the base of the tube.

Figure 1:
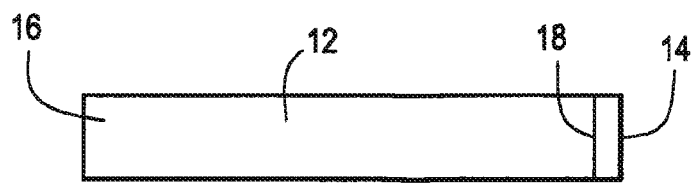
FIGS. 1 to 3 are diagrams of the prior art protection member.
Figure 2:
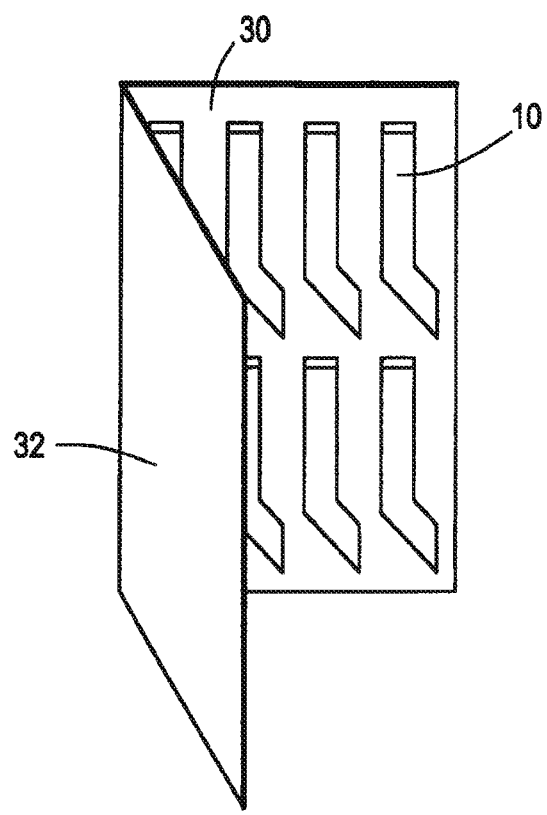
Figure 3:
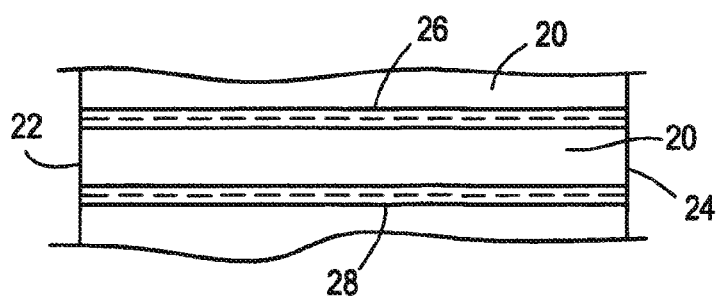

According to the invention, the member of the type illustrated in FIG. 1 is improved by the incorporation of a preferential folding device which is constituted, in the example illustrated, by a contraction or a reduction of the cross-section 42 of the tube. In this manner, the smallest cross-section of the portion 34 is located at a location corresponding to the bend of a crook-like spectacle arm.

Such a contraction 42 can be produced in a production method which involves the extrusion of a continuous tube of plastics material having thermoretractable properties, then the localised heating of the tube over the entire periphery thereof practically so that the cross-section thereof is reduced at a preferred folding location, then cutting the tube at regular intervals and the transverse welding thereof close to the cut, in order to form tube portions which are intended to constitute temporary spectacle arm protection members.

Compared with the protection member illustrated in FIG. 1, the member illustrated in FIG. 4 has at least two significant advantages, on the one hand, the fact that the contraction 42 which constitutes the preferential folding device is positioned at the bend and therefore positions the protection member along the length of the spectacle arm, and, on the other hand, the fact that the quantity of material at the location of the bend of the spectacle arm which is closest to the skin of the ear and the head of the person wearing the spectacles is significantly reduced and therefore reduces the irritation and discomfort, even when the material of the tube of the member 34 is relatively thick or rigid.

Figure 5:
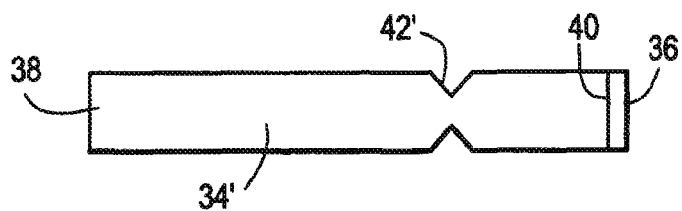
FIG. 5 is a front view of a protection member according to the invention illustrating a variant of a preferential folding device.

FIG. 5 illustrates a variant of the casing 34' of the embodiment of FIG. 4. In this variant, in place of a contraction of the cross-section 42 obtained by means of heating using the thermoretractable properties of the material, the cross-section is reduced when, after the tube has been crushed flat, notches 42' are formed at the sides and are welded in order to ensure the continuity of the sealing at the two edges. Although these weld seams have been illustrated with clear edges, it is desirable, for contact comfort, for the shape of the notches to be rounded, with a shape similar to that illustrated in FIG. 4.

Figure 6:
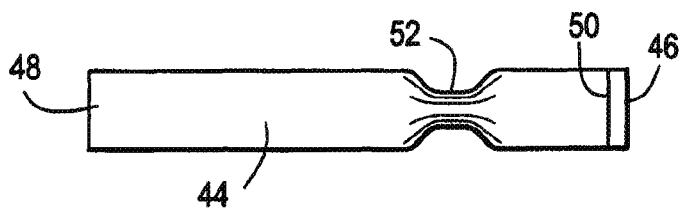
FIG. 6 illustrates another embodiment of a preferential folding device.

The preferential folding device is not necessarily a reduction in cross-section, as illustrated in FIGS. 4 and 5. FIG. 6 illustrates an embodiment in which the preferential folding device is constituted by a gathering of a tube portion parallel with generating lines thereof.

More precisely, as indicated in FIG. 6, a casing which is formed by a tube portion 44, having ends 46 and 48 and a weld seam 50 for closing one end comprises, at the location corresponding to the position of the bend of a crook-like spectacle arm, a gathering along generating lines of the tube, that is to say, parallel with the axis of the tube. In this manner, the effective diameter of the tube in the gathered region 52 is clearly reduced and facilitates folding, with no loss of sealing with respect to chemical agents.

Figure 7:
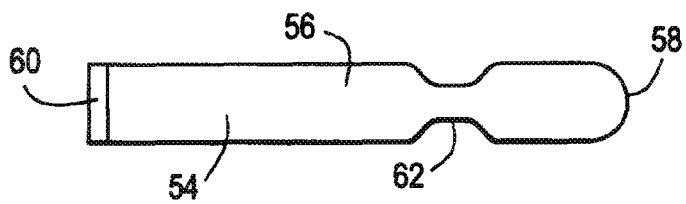
FIG. 7 is a preferred embodiment of the spectacle arm protection member according to the invention, produced using the technique described with reference to FIG. 2.
Figure 8:
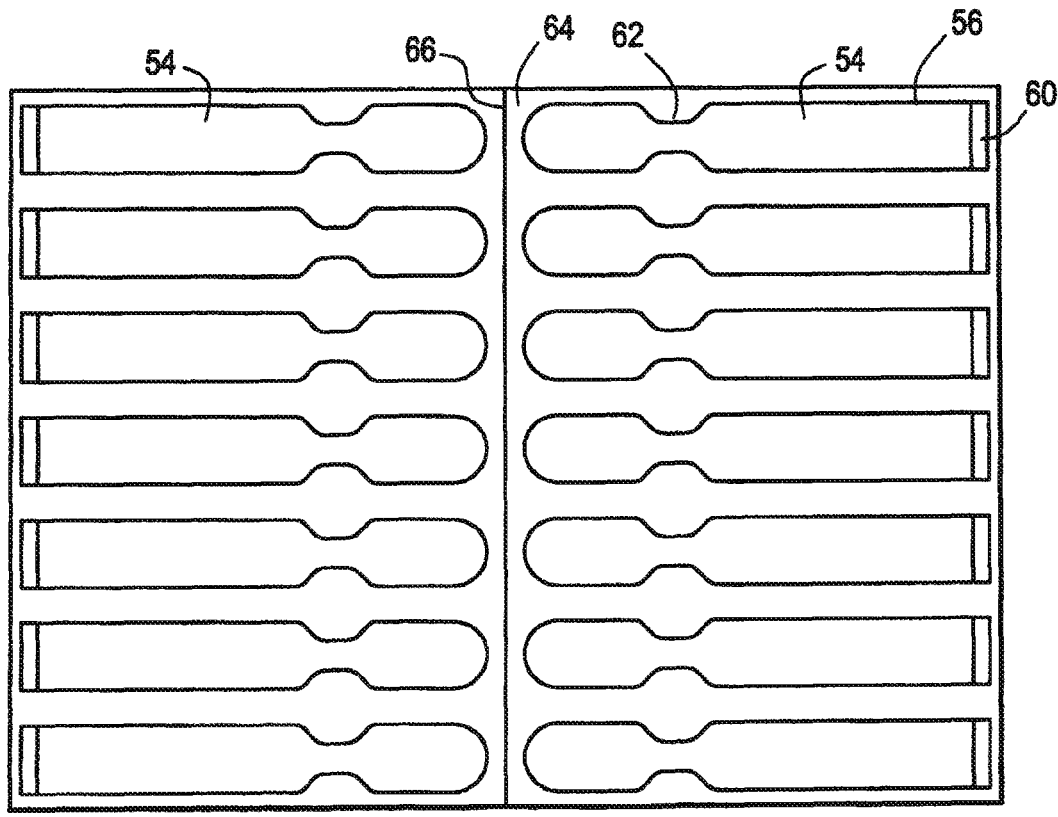
FIG. 8 is a plan view of a board of spectacle arm protection members according to the invention.

FIGS. 7 and 8 illustrate a preferred embodiment of the invention. This embodiment is used in the same manner as the temporary protection members described in the above-mentioned document EP-305 281 to which reference can be made, that is to say, by means of welding two thin and flexible sheets to a support sheet 64.

FIG. 7 illustrates a separate protection member and FIG. 8 a board of protection members. In FIG. 7, a shaped casing 54 of the protection member is delimited at the longitudinal sides 56 thereof and at the closed end thereof by a continuous weld seam of the two sheets. At the open end 60, the two sheets are preferably slightly offset, since this arrangement facilitates the opening of the member for introducing the end of a spectacle arm. Instead of being rectilinear between the two ends 60 and 58, the weld seam at each side has a sinuous shape in a portion or notch 62 so that the cross-section of the tube is reduced at the location corresponding to the crook-like bend of a spectacle arm.

Although a particularly advantageous shape of rounded curvature has been illustrated, any other shape as described with reference to FIG. 5 can be used. Owing to the flexibility of the sheets constituting the casing 54 of the protection member, it is even possible to form clear corners with no noticeable irritation for the user.

The sheets used for the casing 54 of the protection member are preferably very thin sheets, for example, of polyolefin, the thickness being less than 10 μm and preferably in the order of a few micrometres. Although both sheets or only one of them may be opaque, it is preferable for the sheets to be transparent and advantageously coloured, for example, blue.

The width between the sides of the casing 54 of the protection member is sufficient for the spectacle arm not to be compressed, even in the portion having the smallest cross-section which must allow the outermost end of the spectacle arm to pass through. This relatively substantial width facilitates the sliding of the spectacle arm.

FIG. 8 illustrates a board of spectacle arm protection members comprising a support sheet 64, for example, formed by paper. Owing to the rectilinear shape of the casings 54 of the protection members, they may be close to each other and a large number of them may be on the same sheet. The reference numeral 66 indicates a folding line of the sheet 64 which, after being folded, protects the protection members.

In the production method of this board, dies having the desired profile for the weld seam of each casing 54 of the protection member apply a pressure to the sheets of plastics materials and the support sheet in order to weld and cut the casings 54 of the protection members and to fix them to the support sheet.

The invention claimed is:

1. A protection member for providing a temporary protection of a spectacle arm against chemical agents, comprising:
    an elongate tubular casing having at least one open end for arranging said elongate tubular casing on said spectacle arm, formed of plastics material which is impermeable with respect to chemical treatment agents, and having a cross-section over an entire length thereof such that said spectacle arm is not compressed and space remains around said spectacle arm, thereby facilitating an introduction of said spectacle arm into said elongate tubular casing; wherein said elongate tubular casing has a length to cover at least a largest portion of said spectacle arm; and
    wherein said spectacle arm being a crook-like spectacle arm having a bend and said elongate tubular casing having a substantially planar shape in a plane of said crook-like spectacle arm such that said elongate tubular casing can be arranged on said crook-like spectacle arm; and
    a folding device for preferential folding about a transverse axis at a location corresponding to a position of said bend of said crook-like spectacle arm for reducing, at said location, a distance between an inner edge of said bend of said crook-like spectacle arm and an edge of said protection member arranged at a side of an interior of said bend.

2. The protection member of claim 1, wherein said folding device is a reduction of the cross-section of said elongate tubular casing.

3. The protection member of claim 2, wherein the reduction of the cross-section of said elongate tubular casing is a width reduction of said elongate tubular casing of planar form.

4. The protection member of claim 3, wherein the width reduction is a progressive reduction.

5. The protection member of claim 2, wherein the reduction of the cross-section of said elongate tubular casing is a localized progressive reduction of the cross-section of said elongate tubular casing.

6. The protection member of claim 1, wherein said folding device comprises a gathering of a wall of said elongate tubular casing.

7. The protection member of claim 1, wherein said elongate tubular casing is formed by two sheets of said plastics material welded to each other along longitudinal sides; and wherein a distance between said two longitudinal sides are reduced at the location of said folding device.

8. A board of spectacle arm protection members, comprising a support sheet and a plurality of protection members of claim 7 fixed to said support sheet.

9. The protection member of claim 1, wherein edges of an opening of said at least one open end are offset relative to each other in a longitudinal direction of said elongate tubular casing.

10. A method for producing temporary spectacle arm protection members, comprising the steps of:

extruding a continuous tube of thermoretractable plastics material;

cutting said continuous tube at regular intervals to form tube portions, each tube portion constituting an elongate tubular casing of a temporary spectacle arm protection member; and localized heating of said continuous tube before cutting said continuous tube to reduce a cross-section of said each tube portion.

* * * * *